US008599134B2

(12) United States Patent
Zhang (10) Patent No.: US 8,599,134 B2
(45) Date of Patent: Dec. 3, 2013

(54) APPARATUS, METHOD, AND SYSTEM FOR IDENTIFYING LASER SPOT

(75) Inventor: Wenbo Zhang, Beijing (CN)

(73) Assignee: Ricoh Company, Ltd., Tokyo (JP)

( * ) Notice: Subject to any disclaimer, the term of this patent is extended or adjusted under 35 U.S.C. 154(b) by 503 days.

(21) Appl. No.: 13/021,046

(22) Filed: Feb. 4, 2011

(65) Prior Publication Data

US 2011/0221919 A1  Sep. 15, 2011

(30) Foreign Application Priority Data

Mar. 11, 2010  (CN) .......................... 2010 1 0122008

(51) Int. Cl.
G09G 5/08 (2006.01)
(52) U.S. Cl.
USPC ........................................................ 345/158
(58) Field of Classification Search
USPC ................................................. 345/156–178
See application file for complete search history.

(56) References Cited

U.S. PATENT DOCUMENTS

| 6,720,949 | B1 * | 4/2004 | Pryor et al. | 345/158 |
| 2002/0036617 | A1 * | 3/2002 | Pryor | 345/156 |
| 2003/0132912 | A1 | 7/2003 | Hamana et al. | |
| 2006/0238493 | A1 * | 10/2006 | Dunton | 345/156 |
| 2006/0284832 | A1 | 12/2006 | Kuo | |

OTHER PUBLICATIONS

Dan R. Olsen Jr. et al., "Laser Pointer Interaction", CHI 2001 Proceedings of the SIGCHI Conference on Human Factors in Computing Systems, Mar. 31, 2001, 7 Pages.

* cited by examiner

Primary Examiner — Jimmy H Nguyen
(74) Attorney, Agent, or Firm — Oblon, Spivak, McClelland, Maier & Neustadt, L.L.P.

(57) ABSTRACT

Disclosed are an apparatus, a method, and a system for identifying a laser spot and locating coordinates of the laser spot. The apparatus comprises a foreground calculation unit used to calculate a foreground image in an input image captured by a camera device; a threshold value estimation unit used to automatically estimate, at an initialization stage, pixel brightness threshold values, pixel degree-of-saturation threshold values, and a pixel color-tone threshold value range based on the foreground image; a laser spot detection unit used to detect, at a processing stage, the laser spot based on the foreground image as well as the pixel brightness threshold values, the pixel degree-of-saturation threshold values, and the pixel color-tone threshold value range; and a coordinate locating unit used to calculate the coordinates of the laser spot in the input image based on the laser spot detected by the laser spot detection unit.

10 Claims, 6 Drawing Sheets

APPARATUS, METHOD, AND SYSTEM FOR IDENTIFYING LASER SPOT

BACKGROUND OF THE INVENTION

1. Field of the Invention

The present invention relates to the field of image processing, and more particularly relates to an apparatus, a method, and a system for automatically identifying a laser spot and locating coordinates of the laser spot in an image.

2. Description of the Related Art

With requirements of users and development of technologies, a virtual whiteboard system or a virtual presentation system, in which a laser pointer is adopted to be as an input device, has been developed; by using the virtual whiteboard system or the virtual presentation system, an image is projected onto a screen.

For example, an apparatus for locating a laser spot is disclosed in the below cited reference No. 1; a presentation system using a laser pointer is disclosed in the below cited reference No. 2; and a technique of realizing interaction by employing a laser pointer and a camera is proposed in the below cited reference No. 3.

However, in the above-mentioned conventional techniques, there are still various problems of how to automatically identify the laser spot and locate the coordinates of the laser spot.

For example, in the technique disclosed in the below cited reference No. 1, it is necessary to utilize uncalled-for hardware to locate the coordinates of the laser spot; as a result, complexity of the system is increased, and then cost of the system is increased too.

Furthermore, in the technique disclosed in the below cited reference No. 2, visible light is not able to be detected, and it is necessary to employ uncalled-for hardware to support the presentation system; as a result, complexity and cost of the system are increased.

In addition, in the technique proposed in the below cited reference No. 3, only the brightest portion of the laser spot is of concern; as a result, accuracy of the detection result may be reduced, and a specific exposure condition is required, i.e., a function of automatically adjusting brightness in the camera has to be turned off.

Therefore it would be desirable to provide a technique of being able to accurately identify a laser spot and locate coordinates of the laser spot in an image without adopting uncalled-for hardware, for example, the uncalled-for hardware mentioned above.

Cited Reference No. 1: US Patent Application Publication No. 20060284832 A1

Cited Reference No. 2: US Patent Application Publication No. 20030132912 A1

Cited Reference No. 3: Dan R. Olsen Jr. and Travis Nielsen, Laser pointer Interaction

SUMMARY OF THE INVENTION

In order to overcome the disadvantages of the prior art, the present invention provides an apparatus, a method, and a system able to accurately identify a laser spot (or a laser spot area); at the same time, requirements of exposure conditions are decreased, and specific hardware such as a specific diffractive optical element, a specific camera, or the like is not needed.

According to one aspect of the present invention, an apparatus for identifying a laser spot and locating coordinates of the laser spot is provided. The apparatus comprises a foreground calculation unit used to calculate a foreground image in an input image captured by a camera device; a threshold value estimation unit used to automatically estimate, at an initialization stage of the apparatus, a first pixel brightness threshold value, a second pixel brightness threshold value, a first pixel degree-of-saturation threshold value, a second pixel degree-of-saturation threshold value, and a pixel color-tone threshold value range based on the foreground image calculated by the foreground calculation unit; a laser spot detection unit used to detect, at a processing stage of the apparatus, the laser spot based on the foreground image calculated by the foreground calculation unit as well as the first pixel brightness threshold value, the second pixel brightness threshold value, the first pixel degree-of-saturation threshold value, the second pixel degree-of-saturation threshold value, and the pixel color-tone threshold value range; and a coordinate locating unit used to calculate the coordinates of the laser spot in the input image based on the laser spot detected by the laser spot detection unit.

Furthermore, according to an embodiment of the present invention, the foreground calculation unit first calculates a background image in the input image, and then calculates the foreground image by subtracting the background image from the input image.

Furthermore, according to an embodiment of the present invention, the threshold value estimation unit analyzes the foreground image, and then estimates the first pixel brightness threshold value, the second pixel brightness threshold value, the first pixel degree-of-saturation threshold value, the second pixel degree-of-saturation threshold value, and the pixel color-tone threshold value range based on brightness values, degree-of-saturation values, and color-tone values of pixels in the foreground image.

Furthermore, according to an embodiment of the present invention, the laser spot detection unit classifies the pixels in the foreground image based on the brightness values, the degree-of-saturation values, and the color-tone values of the pixels in the foreground image, and detects the laser spot based on classified results. If a pixel in the foreground image satisfies the following relationships $$B(p) > T1(b)$$

and $$S(p) < T1(s),$$

then the pixel in the foreground image is classified as belonging to a first category; here p refers to the pixel in the foreground image, B(p) refers to a brightness value of the pixel in the foreground image, T1($b$) refers to the first pixel brightness threshold value, S(p) refers to a degree-of-saturation value of the pixel in the foreground image, and T1($s$) refers to the first pixel degree-of-saturation threshold value. If a pixel in the foreground image satisfies the following relationships $$H(p) \in T(h),$$

$$B(p) > T2(b),$$

and $$S(p) > T2(s),$$

then the pixel in the foreground image is classified as belonging to a second category; here H(p) refers to a color-tone value of the pixel in the foreground image, T(h) refers to the pixel color-tone threshold value range, B(p) refers to a brightness value of the pixel in the foreground image, T2($b$) refers to the second pixel brightness threshold value, S(p) refers to a degree-of-saturation value of the pixel in the foreground image, and T2(s) refers to the second pixel degree-of-saturation threshold value. And the remaining pixels in the foreground image are classified as belonging to a third category.

Furthermore, according to an embodiment of the present invention, the laser spot detection unit detects the laser spot by carrying out operations of calculating one or more combination areas RA and one or more combination areas RB composed of the pixels belonging to the first category and the second category, respectively, and removing all the pixels belonging to the third category; removing the combination areas RA in which the numbers of the pixels are greater than a predetermined threshold value; combining the remaining combination areas RA, in which a distance between any two remaining combination areas RA is less than a predetermined threshold value, so as to generate one or more new combination areas MA; removing the new combination areas MA which are not adjacent to the combination areas RB; combining the combination areas RB which are adjacent to the new combination areas MA so as to generate one or more new combination areas MB; calculating overlapping degrees of the remaining new combination areas MA and the new combination areas MB, and removing the remaining new combination areas MA and the new combination areas MB whose overlapping degrees are less than a predetermined threshold value; calculating outlines of the remaining new combination areas MA; and letting the new combination area MA whose outline is an approximate circle be the laser spot.

Furthermore, according to an embodiment of the present invention, the coordinate locating unit calculates coordinates of the center of the laser spot to serve as the coordinates of the laser spot.

According to another aspect of the present invention, a method of identifying a laser spot and locating coordinates of the laser spot is provided. The method comprises a foreground calculation step of calculating a foreground image in an input image captured by a camera device; a threshold value estimation step of automatically estimating, at an initialization stage, a first pixel brightness threshold value, a second pixel brightness threshold value, a first pixel degree-of-saturation threshold value, a second pixel degree-of-saturation threshold value, and a pixel color-tone threshold value range based on the foreground image calculated by the foreground calculation step; a laser spot detection step of detecting, at a processing stage, the laser spot based on the foreground image calculated by the foreground calculation step as well as the first pixel brightness threshold value, the second pixel brightness threshold value, the first pixel degree-of-saturation threshold value, the second pixel degree-of-saturation threshold value, and the pixel color-tone threshold value range; and a coordinate locating step of calculating the coordinates of the laser spot in the input image based on the laser spot detected by the laser spot detection step.

According to still another aspect of the present invention, a virtual whiteboard system is provided. The virtual whiteboard system comprises a projection device used to project a visible image onto a screen; a laser pointer used to project a laser spot onto the screen; a camera device used to capture the image projected onto the screen; and an apparatus for identifying the laser spot and locating coordinates of the laser spot. The apparatus comprises a foreground calculation unit used to calculate a foreground image in the image captured by the camera device; a threshold value estimation unit used to automatically estimate, at an initialization stage of the apparatus, a first pixel brightness threshold value, a second pixel brightness threshold value, a first pixel degree-of-saturation threshold value, a second pixel degree-of-saturation threshold value, and a pixel color-tone threshold value range based on the foreground image calculated by the foreground calculation unit; a laser spot detection unit used to detect, at a processing stage of the apparatus, the laser spot based on the foreground image calculated by the foreground calculation unit as well as the first pixel brightness threshold value, the second pixel brightness threshold value, the first pixel degree-of-saturation threshold value, the second pixel degree-of-saturation threshold value, and the pixel color-tone threshold value range; and a coordinate locating unit used to calculate the coordinates of the laser spot in the image based on the laser spot detected by the laser spot detection unit.

According to the apparatus, the method, and the system for identifying a laser spot and locating coordinates of the laser spot, it is possible to accurately identify the position of the laser spot without adopting any special hardware so that performance of a virtual whiteboard system or a presentation system may be improved, and cost of the system may be reduced at the same time.

DETAILED DESCRIPTION OF THE PREFERRED EMBODIMENTS

Hereinafter, various embodiments of the present invention will be concretely described with reference to the drawings. Here it should be noted that the same symbols, which are in the specification and the drawings, stand for constructional elements having the same or basically-same function and structure, and repeated explanations for the constructional elements are omitted in the specification.

Figure 1:
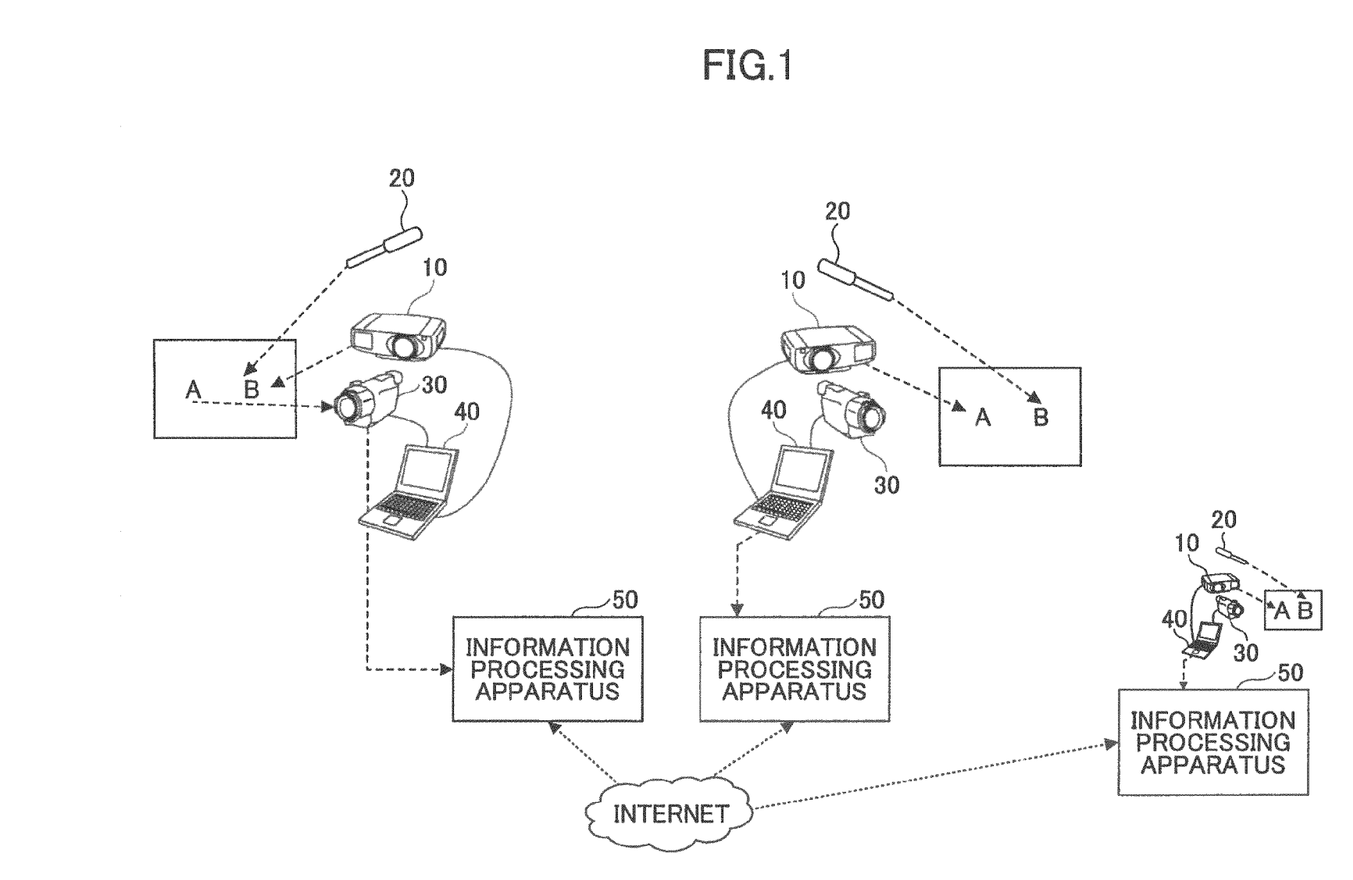
FIG. 1 is a structural block diagram of a virtual whiteboard system according to an embodiment of the present invention.

In what follows, a virtual whiteboard system according to an embodiment of the present invention is described. FIG. 1 illustrates the structure of the virtual whiteboard system 1.

As shown in FIG. 1, the whiteboard system 1 according to the embodiment of the present invention comprises a projection device 10, a laser pointer 20 (such as a laser pen or the like), a camera device 30 (such as a digital camera, a video camera, a network camera, or the like), a laser spot identification apparatus 40, an information processing apparatus 50, etc. The projection device 10 receives a visible image generated by the information processing apparatus 50 (such as a computer, a server, a movable terminal device, or the like), and projects the received visible image onto a screen (such as wall surface, canvas, or the like). The laser pointer 20 is operated by a user, and projects a laser spot onto the screen. For example, the user may utilize the laser pointer 20 to carry out various operations such as writing, selecting, painting, or the like. The camera device 30 captures the image projected onto the screen, and sends the captured image to the laser spot identification apparatus 40 to serve as an input image. The laser spot identification apparatus 40 is connected to the camera device 30, and receives the input image sent by the camera device 30 so as to identify the laser spot and calculate coordinates (i.e. position) of the laser spot in the input image, and then sends the generated coordinate information related to the laser spot to the information processing apparatus 50 so as to execute various operations similar to functions of a mouse, such as writing, selection, painting, or the like.

Here it should be noted that the camera device 30 may connect to the laser spot identification apparatus 40 via a wired or wireless connection. Furthermore the laser spot identification apparatus 40 may be an apparatus such as a computer, a server, a movable terminal device, or the like, and may be merged with the information processing apparatus 50 by, for example, installing software into a terminal device such as a computer or the like. In addition, the information processing apparatus 50 may connect to another information processing apparatus 50 via a network such a local area network, the Internet, or the like so as to send the positional information (i.e. the coordinates) of the laser spot to the other information processing apparatus 50 connected to the network in order to form a system such as a remote presentation system, a remote virtual whiteboard system, or the like.

Figure 2:
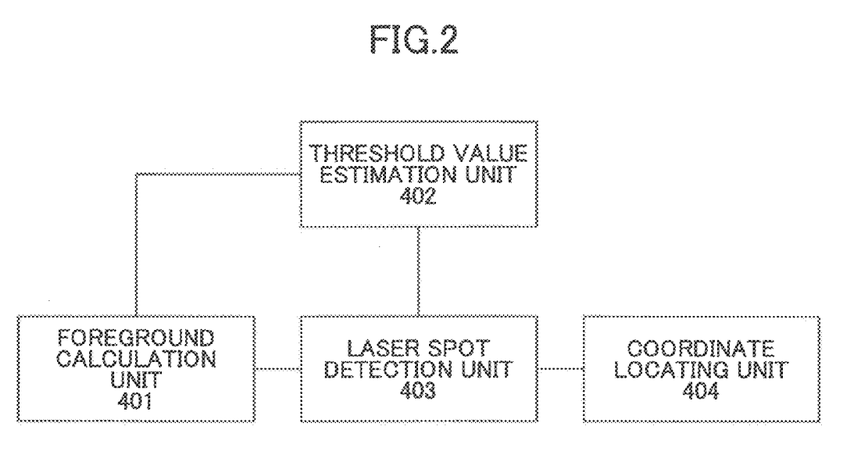
FIG. 2 is a structural block diagram of a laser spot identification apparatus according to an embodiment of the present invention.

Here the structure of the laser spot identification apparatus 40 according to an embodiment of the present invention is briefly described based on FIG. 2. As shown in FIG. 2, the laser spot identification apparatus 40 comprises a foreground calculation unit 401, a threshold value estimation unit 402, a laser spot detection unit 403, and a coordinate locating unit 404. The foreground calculation unit 401 receives the input image sent by the camera device 30, and calculates a foreground image of the input image. At an initialization stage of the laser spot identification apparatus 40, the threshold value estimation unit 402 receives the foreground image from the foreground calculation unit 401, and analyzes the foreground image calculated by the foreground calculation unit 401 so as to generate pixel brightness threshold values, pixel degree-of-saturation threshold values, and a pixel color-tone threshold value range of the foreground image. After the pixel brightness threshold values, the pixel degree-of-saturation threshold values, and the pixel color-tone threshold value range are generated, at a processing stage, the laser spot detection unit 403 detects the laser spot based on pixel values of the respective pixels in the foreground image and the above-mentioned threshold values (as for how to detect the laser spot, it will be concretely described below), and sends the detected result (i.e. the laser spot detected when carrying out the detection processing of the laser spot) to the coordinate locating unit 404. Then the coordinate locating unit 404 calculated the coordinates of the laser spot in the input image captured by the camera device 30 based on the detected result.

Figure 3:
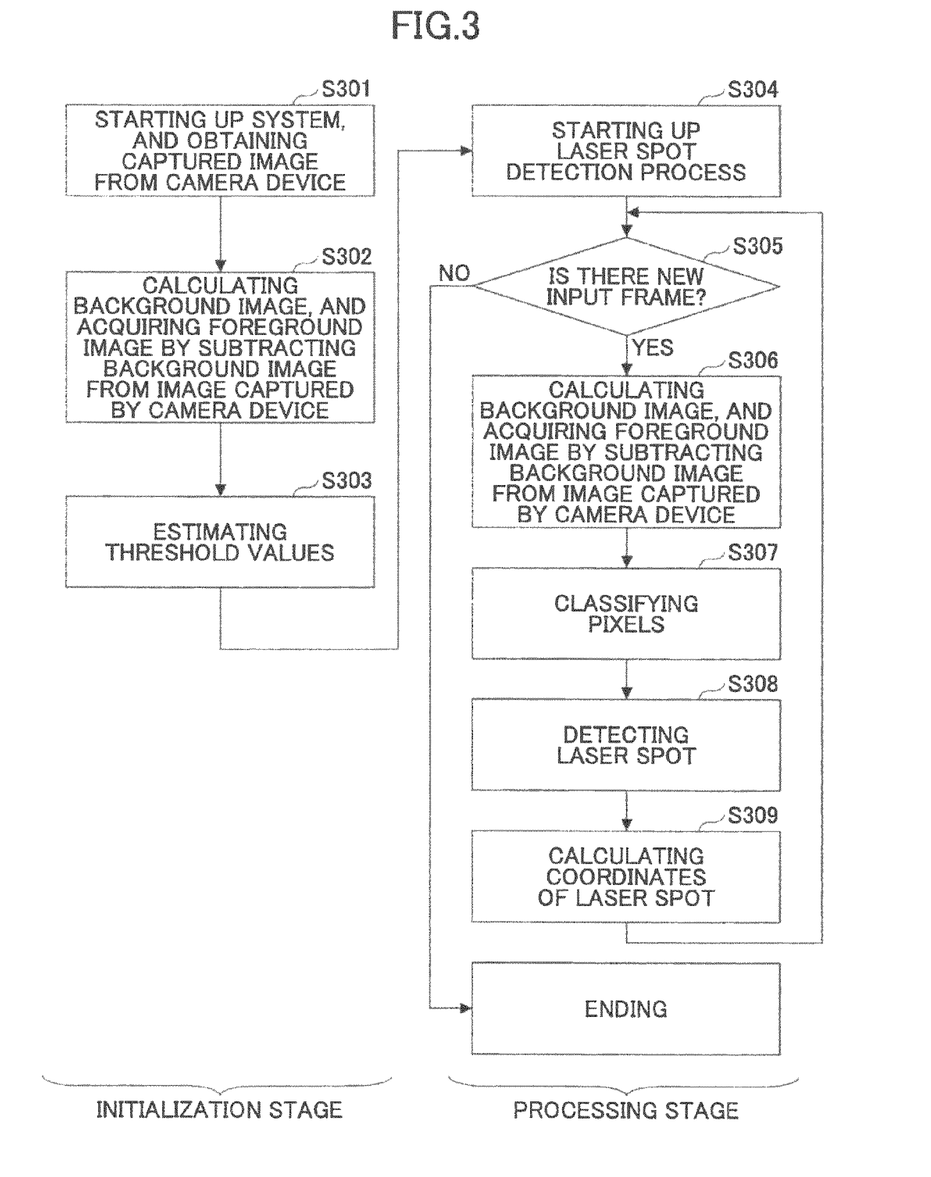
FIG. 3 is a flowchart of briefly illustrating laser spot identification processing executed by a laser spot identification apparatus according to an embodiment of the present invention.

In what follows, a process flow of laser spot identification processing executed by the laser spot identification apparatus 40 according to an embodiment of the present invention is described based on FIG. 3.

At the initialization stage of the virtual whiteboard system 1 including the laser spot identification apparatus 40, etc., in STEP S301, the projection device 10 in the virtual whiteboard system 1 is started up, and projects a predetermined screen image (for example, a start-up screen image or a screen-saver) onto the screen. At the same time, the camera device 30 is started up so as to capture the image projected onto the screen by the projection device 10, and then sends the captured image to the laser spot identification apparatus 40. Here, for example, according to an embodiment of the present invention, at the initialization stage of the virtual whiteboard system 1, it is possible to show the image projected onto the screen by the projection device 10 on a display unit (not shown in the drawings) disposed on the information processing apparatus 50 or the laser spot identification apparatus 40; by this way, the user can adjust the position of the camera device 30 so as to capture the whole image projected onto the screen by the projection device 10.

After this, threshold value estimation processing begins to be executed as follows.

At the initialization stage of the virtual whiteboard system 1, the user may, in a predetermined time period (for example, 10 seconds), utilize the laser pointer 20 to project the laser spot onto the screen, and freely move the laser spot in the screen area. During the predetermined time period, in STEP S302, the foreground calculation unit 401 in the laser spot identification apparatus 40 receives images in plural frames captured by the camera device 30.

At the same time, with regard to the currently received image (i.e. the image in each of the plural frames), the foreground calculation unit 401 in the laser spot identification apparatus 40 generates a background image based on the currently received image so as to generate a foreground image of the currently received image.

In particular, according to an embodiment of the present invention, the background image is calculated by employing the well-known Gaussian Background Model. Based on the Gaussian Background Model, if a pixel p(x,y) in a given image satisfies the following equation (1), then the pixel p(x,y) is considered a background pixel.

$$\frac{1}{d\sqrt{2\pi}}\exp\left(-\frac{(B(p)-u)^\wedge 2}{2 \times d^\wedge 2}\right) > T \qquad (1)$$

Here B(p) refers to a brightness value of the pixel, u refers to a brightness average value of pixels in the given image, and d refers to a square error. In addition, T may be set based on actual circumstances; in general, an empirical value is adopted.

As mentioned above, by utilizing the Gaussian Background Model, all the background pixels in the currently received image are calculated so as to form the background image. Since how to generate the background image based on the input image is a known technique to those skilled in the art, its concrete description is omitted here. Furthermore it should be noted that the present invention is not limited to this; that is, it is also possible to adopt any other techniques by which the background image can be generated.

Then the foreground calculation unit 401 generates the foreground image by subtracting the calculated background image from the currently received image. In particular, according to an embodiment of the present invention, the subtraction operation is considered being carried out between the respective channels (R, G, and B) of a pixel p1($x,y$) and a pixel p2($x,y$) at the corresponding positions (i.e. two pixels at the same position (x,y)) of two images (for example, the currently received image and the background image of the currently received image). By this way, it is possible to carry out the subtraction operation between two images M1 and M2 (for example, the currently received image and the background image of the currently received image) by using the following equation (2).

$$M1 - M2 = \begin{Bmatrix} R(p1) - R(p2) \\ G(p1) - G(p2) \\ B(p1) - B(p2) \end{Bmatrix} \quad (2)$$

Here R(p1), G(p1), and B(p1) refer to the red channel, the green channel, and the blue channel of the pixel p1($x,y$), respectively; and R(p2), G(p2), and B(p2) refer to the red channel, the green channel, and the blue channel of the pixel p2($x,y$), respectively.

Figure 4A:
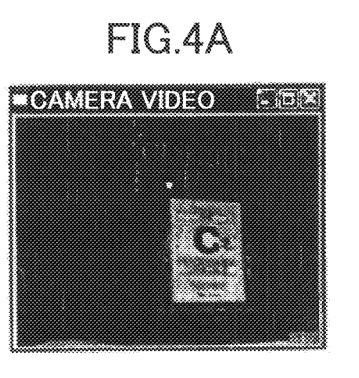
FIGS. 4(A)-4(C) illustrate results of foreground calculation processing applied to a captured image for acquiring a foreground image.
Figure 4B:
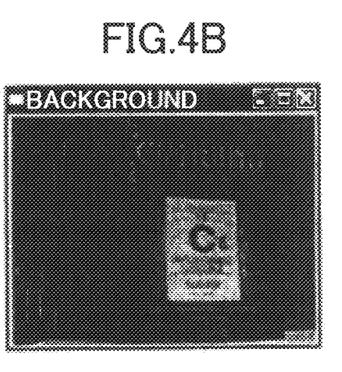
Figure 4C:
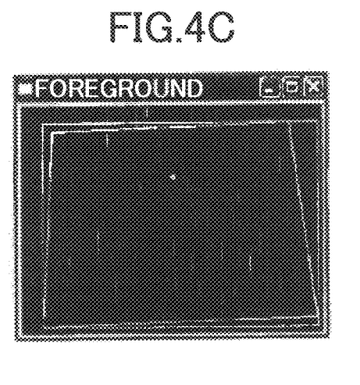

By using the above-mentioned subtraction operation, the foreground image is generated. In the foreground image, almost all objects belonging to the background are removed since the brightness of these kinds of objects is relatively low, whereas the laser spot prepared to be identified and its adjacent area are retained since the brightness of the laser spot and its adjacent area is relatively high. FIGS. 4(A)-4(C) illustrate results of the foreground calculation processing applied to a captured image (i.e. the currently received image) for acquiring the foreground image. FIG. 4(A) illustrates an example of the currently received image, FIG. 4(B) illustrates an example of the calculated background image, and FIG. 4(C) illustrates an example of the foreground image generated by carrying out the above-mentioned subtraction operation. As shown in FIGS. 4(A)-4(C), the foreground calculation unit 401 generates the background image (as shown in FIG. 4(B)) based on the currently received image (as shown in FIG. 4(A)), and subtracts the background image from the captured image so as to generate the foreground image (as shown in FIG. 4(C)); here it should be noted that, as shown in FIG. 4(C), almost all background objects are removed, whereas a high-brightness area such as the laser spot, etc., is retained in the foreground image.

Then, in STEP S303, the threshold value estimation unit 402 receives, at the initialization stage of the virtual whiteboard system 1, the foreground images calculated based on the images in the plural frames from the foreground calculation unit 401, and analyzes these foreground images to estimate the various threshold values (i.e. the pixel brightness threshold values, the pixel degree-of-saturation threshold values, and the pixel color-tone threshold value range). In particularly, according to an embodiment of the present invention, the various threshold values are determined by using brightness values, degree-of-saturation values, and pixel color-tone values of the pixels in the foreground images.

Here since, in general, the format of an image captured by the camera device 30 is RGB format, if the format of the captured image is RGB format, then it is converted to HSV format by using the following equation (3).

$$S = 1 - \frac{3 \min(R, G, B)}{R + G + B} \quad (3)$$
$$V = \frac{1}{\sqrt{3}}(R + G + B)$$
$$H = \begin{cases} \theta & G > B \\ 2\pi - \theta & G \le B \end{cases}$$
$$\theta = \cos^{-1}\left[\frac{\frac{1}{2}[(R-G)+(R-B)]}{\sqrt{(R-G)^2 + (R-B)(G-B)}}\right]$$

Here S refers to degree of saturation of a pixel, V refers to brightness of the pixel, and H refers to color tone of the pixel.

In this way, it is possible to convert the format of the foreground images. However, since the above-mentioned format conversion is a known technique to those practiced in the art, its concrete description is omitted here.

According to an embodiment of the present invention, it is possible to arbitrarily set the pixel brightness threshold values; here the pixel brightness threshold values may be set directly based on empirical values. For example, in general, the brightness value in the central portion of the laser spot is within a range of [230, 255], whereas the brightness value in the surrounding portion of the laser spot is within a range of [160, 230]; therefore, here, the threshold value estimation unit 402 may set a first pixel brightness threshold value T1($b$) in the range of [230, 255], and set a second pixel brightness threshold value T2($b$) in the rang of [160, 230].

Furthermore, for example, the threshold value estimation unit 402 calculates an average value of the degree-of-saturation values of the pixels whose brightness values are within the range of [230, 255], in each of the foreground images, and calculates an average value of the degree-of-saturation values of the pixels whose brightness values are within the range of [160, 230], in each of the foreground images. After the average values of the degree-of-saturation values of the pixels whose brightness values are within the above-mentioned two ranges, in each of the foreground images are calculated, the threshold value estimation unit 402 further calculates average values of the degree-of-saturation values of the pixels whose brightness values are within the above-mentioned two ranges, in all the foreground images during a predetermined time period (for example, 10 seconds). For example, if it is supposed that the average frame rate of the camera device 30 is 20 fps, then it is possible to obtain 200 images in 200 frames in the predetermined time period. In this circumstance, it is possible to calculate the average values of the degree-of-saturation values of the pixels whose brightness values are within the above-mentioned two ranges, in all the 200 foreground images in 200 frames to be the final first and second pixel degree-of-saturation threshold values T1($s$) and T2($s$).

In addition, as for the pixel color-tone threshold value range, since each color has the corresponding color-tone value range in HSV model, i.e., all the color-tone values are known, it is not necessary to set that purposely. In this embodiment, for example, if it is necessary to detect a red laser spot, then the threshold value estimation unit 402 may set the corresponding color-tone range of red color as the pixel color-tone threshold value range based on the detected laser color or a user input (for example, "red color", etc.), and if it is necessary to detect a green laser spot, it is possible to set the corresponding color-tone range of green color as the pixel color-tone threshold value range.

Up to here it has been described that the HSV model is employed to carry out the threshold value estimation processing with regard to the foreground images by using the threshold value estimation unit 402. However, it should be noted that the present invention is not limited to this; in other words, the embodiments of the present invention may adopt any other models able to obtain the above-mentioned pixel threshold values. Furthermore the threshold value estimation unit 402 may also use the first and second pixel brightness threshold values, the first and second pixel degree-of-saturation threshold values, and the pixel color-tone threshold value range calculated based on one foreground image in a specific frame. Also, for example, the threshold value estimation unit 402 may include a storage module (not shown in the drawings) to store the threshold values used before so that the user can directly call the stored threshold values in a similar environment; as a result, the threshold value estimation processing can be further simplified.

After the threshold value estimation unit 402 carries out the threshold value estimations processing for estimating the various threshold values, the laser spot identification processing goes to STEP S304.

In STEP S304, the virtual whiteboard system 1 enters the processing stage; that is, the user uses the laser pointer 20 to carry out various operations, and the laser spot identification apparatus 40 starts up laser spot detection processing.

After the laser spot identification apparatus 40 starts up the laser spot detection processing in STEP S304, the laser spot identification processing goes to STEP S305. In STEP S305, the laser spot identification apparatus 40 determines whether a new input image captured by the camera device 30 is received from the camera device 30. If the laser spot identification apparatus 40 determines that there is a new input frame from the camera device 30, then the laser spot identification processing goes to STEP 306; if the laser spot identification apparatus 40 determines that there is not a new input frame from the camera device 30, then the laser spot identification processing ends.

In a circumstance where the laser spot identification apparatus 40 determines that there is a new input image, the laser spot identification processing goes to STEP S306. In STEP 306, the foreground calculation unit 401 in the laser spot identification apparatus 40 calculates a background image of the new input image, and generates a foreground image by subtracting the background image from the new input image. It should be noted that since how to generate the foreground image is described above, its concrete description is omitted here.

After the foreground calculation unit 401 calculates the foreground image of the new input image captured by the camera device 30, the laser spot identification processing goes to STEP S307 to carry out pixel classification processing. In STEP S307, the laser spot identification apparatus 40 receives the foreground image calculated by the foreground calculation unit 401, of the new input image captured by the camera device 30, and classifies the pixels in the foreground image based on the foreground image and the above-mentioned threshold values (i.e. the pixel brightness threshold values, the pixel degree-of-saturation threshold values, and the pixel color-tone value range) generated by the threshold value estimation unit 402.

Here, before describing the pixel classification processing, a property of the laser spot projected onto the screen is briefly illustrated. In general, distribution of brightness values and degree-of-saturation values of the laser spot is regularly changed. For example, the brightness in the central portion of the laser spot is highest, and gradually decays from the central portion to the surrounding portion. In general, the core portion (i.e. the center) of the laser spot has the strongest energy (i.e. the highest brightness), and its color information is lost because its brightness is too high (i.e. the center looks like a white spot). On the contrary, the brightness in the surrounding portion of the laser spot is lower than that in the core portion of the laser spot due to the brightness decay; however, in the surrounding portion of the laser spot, the color information (for example, red, green, etc.) is retained, and the degree of saturation is relatively high.

Then the pixel classification processing executed by the laser spot detection unit 403 is concretely described as follows.

For example, if a pixel in the foreground image satisfies the following equation (4), then the laser spot detection unit 403 classifies this pixel as one belonging to A category.

$$B(p) > T1(b)$$

$$S(p) < T1(s) \quad (4)$$

Here p refers to the pixel in the foreground image, $B(p)$ refers to the brightness value of the pixel, $S(p)$ refers to the degree-of-saturation value of the pixel, $T1(b)$ refers to the first pixel brightness threshold value calculated in the above-mentioned threshold value estimation processing, and $T1(s)$ refers to the first pixel degree-of-saturation threshold value calculated in the above-mentioned threshold value estimation processing.

The pixel belonging to A category classified based on the above-mentioned equation (4) refers to one having relatively high brightness and relatively low degree of saturation in the foreground image. As mentioned above, the brightness of the central portion of the laser spot is very high (i.e. the central portion of the laser spot looks like a white area in an image), and the degree of saturation of the central portion of the laser spot is relatively low due to the loss of color information; as a result, the pixel belonging to A category classified based on the equation (4) belongs to the central portion of the laser spot in general.

In addition, if a pixel in the foreground image satisfies the following equation (5), then the laser spot detection unit 403 classifies this pixel as one belonging to B category.

$$H(p) \in T(h)$$

$$B(p) > T2(b)$$

$$S(p) > T2(s) \quad (5)$$

Here p refers to the pixel in the foreground image, $H(p)$ refers to the color-tone value of the pixel, $B(p)$ refers to the brightness value of the pixel, $S(p)$ refers to the degree-of-saturation value of the pixel, $T(h)$ refers to the pixel color-tone threshold value range, $T2(b)$ refers to the second pixel brightness threshold value calculated in the above-mentioned threshold value estimation processing, and $T2(s)$ refers to the second pixel degree-of-saturation threshold value calculated in the above-mentioned threshold value estimation processing. In an embodiment of the present invention, the pixel color-tone threshold value range $T(h)$ is set based on the color of a laser spot prepared to be detected (for example, the color may be red or green). For example, in the HSV model, if a red laser spot needs to be detected, then the pixel color-tone threshold value range may be between 0~30 and 330~360. Here it should be noted that since the pixel color-tone threshold value range is certain in the HSV model, it is only necessary to choose the pixel color-tone threshold value range corresponding to a specific color in the above-mentioned threshold value estimation processing.

The pixel belonging to B category classified based on the above-mentioned equation (5) refers to one whose brightness is not highest in the foreground image; however, the color of this pixel belongs to a specific color, and the degree of saturation of this pixel is relatively high. As mentioned above, the brightness of the pixel in the surrounding portion of the laser spot is not highest due to the brightness decay, the color information of the pixel is still reserved, and the degree of saturation of the pixel is generally very high; as a result, the pixel belonging to B category classified based on the equation (5) belongs to the surrounding portion of the laser spot.

If a pixel does not satisfies the equation (4) and the equation (5), then the laser spot detection unit 403 classifies this pixel as one belonging to C category. The pixel belonging to C category refers to one that is not related to the laser spot and its surrounding portion; as a result, when carrying out the laser spot detection processing, this kind of pixel belonging to C category needs to be discarded so that unnecessary interference can be reduced.

Figure 5A:
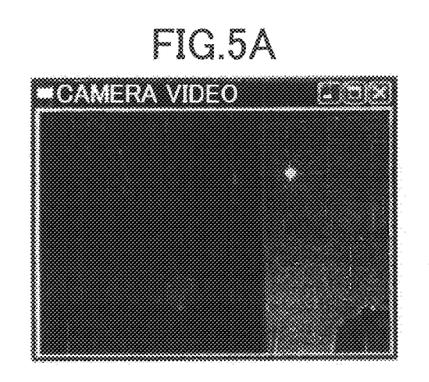
FIGS. 5(A)-5(D) illustrate results of pixel classification processing applied to pixels in a foreground image of a captured image.
Figure 5B:
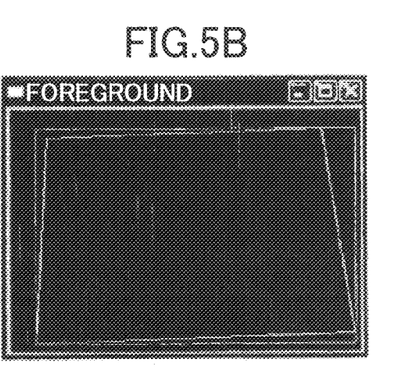
Figure 5C:
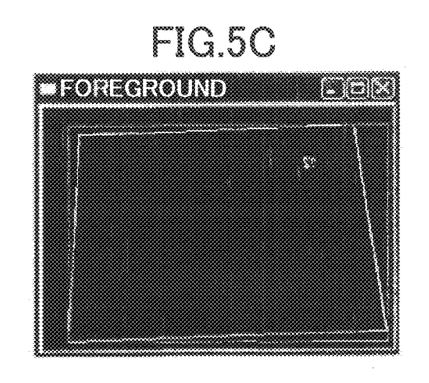
Figure 5D:
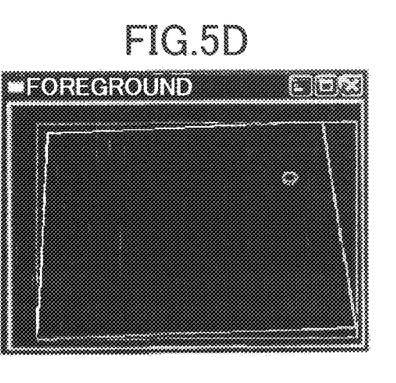

FIGS. 5(A)-5(D) illustrate results of the pixel classification processing applied to pixels in a foreground image of a captured image; FIG. 5(A) illustrates an image (including a laser spot) captured by the camera device 30, FIG. 5(B) illustrates pixels belonging to A category, FIG. 5(C) illustrates pixels belonging to B category, and FIG. 5(D) illustrates a combination of the pixels belonging to A category and the pixels belonging to B category. As shown in FIGS. 5(A)-5(D), based on the results of the pixel classification processing, it is almost impossible to accurately detect the laser spot.

Figure 6A:
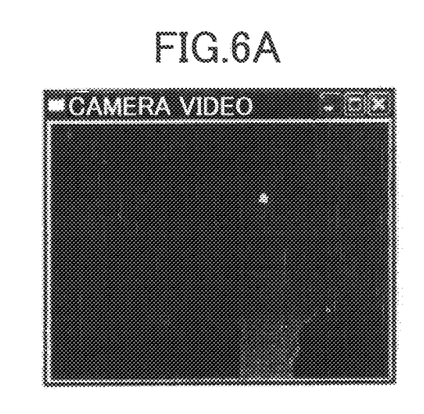
FIGS. 6(A) and 6(B) illustrate interference in a captured image and a result of laser spot detection processing applied to a foreground image of the captured image, respectively.

However, although the laser spot may be nearly detected based on the pixel classification processing carried out by the laser spot detection unit 403, since there is interference in the image captured by the camera device 30 in most cases (for example, FIG. 6(A) illustrates the interference in the image captured by the camera device 30), it is necessary to consider the interference when detecting the laser spot. As shown in FIG. 6(A), there are plural interference portions (for example, a relatively bright character portion, reflection of light of one's hand, or the like); in this case, the result of the laser spot detection processing obtained based only on the above-mentioned pixel classification processing is not best. As a result, after the laser spot detection unit 403 carries out the pixel classification processing applied to the pixels in the foreground image, the laser spot identification processing goes to STEP S308 to further detect the laser spot based on the results of the classification processing.

In STEP 308, the laser spot detection unit 403 carries out the laser spot detection processing. In particular, with regard to all the pixels belonging to A category and all the pixels belonging to B category, the laser spot detection unit 403 calculates at least one combination area RA and at least one combination area RB of the pixels belonging to A category and the pixels belonging to B category, respectively; at the same time, the laser spot detection unit 403 removes all the pixels belonging to C category. For example, an algorithm for calculating the combination areas RA and RB is as follows: with regard to any two pixels p and q, if q is in a 8-neighbor pixel set $N8(p)$ of the pixel p (here it should be noted that the pixel p has 8 neighbor pixels), then the pixels p and q are neighboring ones; here the 8-neighbor pixel set $N8(p)$ of the pixel p(x,y) is defined as follows:

$$N8(p)=\{p(x-1,y-1),p(x,y-1),p(x+1,y+1), p(x-1,y),p(x+1,y),p(x-1,y+1),p(x,y+1),p(x+1,y+1)\}.$$

The combination areas RA and RB are formed of respective pixels satisfying the above 8-neighbor pixel relationship. Since the algorithm for calculating the combination areas RA and RB is a known approach to those skilled in the art, its concrete description is omitted here.

After the laser spot detection unit 403 calculates the combination areas RA and RB, since the size of the laser spot itself is very small, the laser spot detection unit 403 may discard at least one combination area RA in which the number of the pixels is too large by using a predetermined pixel number threshold value; the discarded combination area RA refers to a relatively bright interference portion (for example, a bright spot, etc.) in the foreground image. Here it should be noted that the predetermined pixel number threshold value may be set to different values according to various specific circumstances (for example, the size of the adopted laser pen, etc.).

For example, in an embodiment of the present invention, the predetermined pixel number threshold value is set to 10, and at least one combination area RA in which the number of the pixels is greater than 10 is discarded.

After the laser detection unit 403 discards the large combination area RA, it combines plural remaining combination areas RA having relatively small distance among them so as to generate at least one new combination area MA; here the distance between two remaining combination areas RA is a minimum one between any two points in the two remaining combination areas RA (for example, the minimum distance may be the pixel pitch distance, double the pixel pitch distance, etc.). By carrying out this kind of combination, even if there is interference in the laser spot area, it is possible to accurately form an entire laser spot area. Then the laser spot detection unit 403 determines whether the new combination area MA is connected to the combination area RB. If the new combination area MA is not connected to the combination area RB, i.e., the new combination area MA is an isolated area, then this new combination area MA can be discarded.

Next the laser spot detection unit 403 combines the combination areas RB connecting to the new combination area MA so as to generate at least one new combination area MB by carrying out similar processing for generating the new combination area MA. By generating the new combination area MB, it is possible to generate an area including the surrounding portion of the laser spot; here, the surrounding portion has the color information.

Figure 6B:
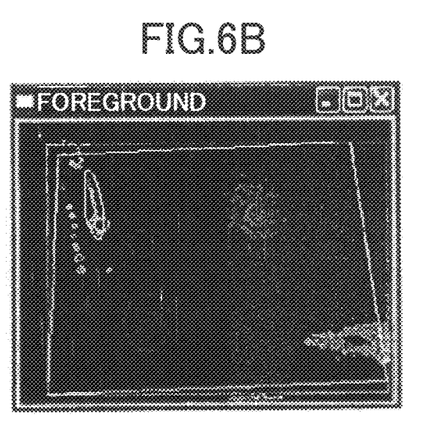

After this, the laser spot detection unit 403 calculates outlines of the new combination area MA and the new combination area MB, and then calculates an overlapping degree of the outlines of the new combination area MA and the new combination area MB. Then, by using a predetermined overlapping degree threshold value (it may be set based on actual circumstances; in this embodiment, an empirical value is adopted), the laser spot can be accurately detected. It should be noted that since calculations of the outlines and the overlapping degree are known approaches to those trained in the art, it is possible to adopt any conventional approaches to calculate the outlines and the overlapping degree, and those concrete descriptions are omitted here. In this embodiment, if it is determined that the outline of the new combination area MA is an approximate circle, and the overlapping degree of the outlines of the new combination area MA and the new combination area MB is greater than the predetermined overlapping degree threshold value, then the laser spot detection unit 403 determines that the new combination area MA is the laser spot, and discards the other new combination areas MA and MB that do not satisfy the above-mentioned conditions if they exist. FIG. 6(B) illustrates a result of the laser spot detection processing. As shown in FIG. 6(B), since two new combination areas MA and MB located at the top left portion in the figure do not overlap, they are discarded; since two new combination areas MB located at the middle portion do not overlap with any new combination area MA, they are discarded too. By this way, the new combination area MA located at the top right portion of the figure is accurately detected as the laser spot. As a result, even if there are plural interference portions in the image captured by the camera device 30, it is also possible to accurately detect the laser spot by using the laser spot identification apparatus 40 according to the embodiments of the present invention.

After the laser spot detection unit 403 detects the laser spot by carrying out the above-mentioned laser spot detection processing, the laser spot identification processing goes to STEP S309 to calculate the coordinates of the laser spot. In STEP S309, the coordinate locating unit 404 calculates the positional coordinates of the laser spot based on the detected laser spot in STEP S308. However, the result obtained in STEP S308 is an area (for example, the new combination area MA), and the area i.e. the new combination area MA includes lots of pixels in general; therefore, according to an embodiment of the present invention, the coordinate locating unit 404 calculates the coordinates of the center of these pixels to be the coordinates of the detected laser spot. In particular, in the detected laser spot area, if it is supposed that its center is $c(x_0, y_0)$, then the coordinates of the center of the detected laser spot area may be calculated, for example, by the following equation (6).

$$x_0 = \frac{\sum_{\forall p(x,y) \in A} N(x) \times x}{\sum_{\forall p(x,y) \in A} N(x)}$$

$$y_0 = \frac{\sum_{\forall p(x,y) \in A} N(y) \times y}{\sum_{\forall p(x,y) \in A} N(y)}$$

(6)

Here A refers to the detected laser spot area; p refers to any pixel in the detected laser spot area A; x and y refer to the coordinates of the pixel p; function N(x) refers to the number of pixels whose x-axis coordinates are equal to x, in the detected laser spot area A; function N(y) refers to the number of pixels whose y-axis coordinates are equal to y, in the detected laser spot area A. As a result, the coordinate locating unit 404 may calculate the coordinates of $c(x_0, y_0)$ to serve as the coordinates of the detected laser spot by utilizing the equation (6).

After the coordinate locating unit 404 calculates the coordinates of the detected laser spot, the laser spot identification processing goes back to STEP S305 to determine whether a new input image captured by the camera device 30 is received from the camera device 30. If there is a new input image, then STEPS S306~S309 are executed repeatedly; otherwise the laser spot identification processing ends.

As mentioned above, by carrying out the above-mentioned laser spot detection processing, even if there are plural interference portions in the image captured by the camera device 20, it is also possible to detect the laser spot and to calculate the position (i.e. the coordinates) of the laser spot; as a result, the information processing apparatus 50 may perform a predetermined operation (for example, an operation similar to a mouse input operation or a keyboard input operation) based on the position of the laser spot and a predetermined procedure. Therefore, in the virtual whiteboard system 1 according to the embodiments of the present invention, it is possible to accurately locate the laser spot so as to increase usability and stability of the virtual whiteboard system 1.

Up to here various embodiments of the present invention have been concretely described; here it should be noted that the embodiments of the present invention may be conducted by adopting hardware, software, or a combination of hardware and software. The software, in some embodiments, may be installed into an information processing apparatus such as a common-purpose personal computer, a server, a digital terminal device, or the like. Besides the software may include (but not limited to) firmware, built-in software, micro codes, or the like.

In addition, a computer program, which may be executed by a computer or any other instruction execution systems, is adopted to execute the laser spot identification processing according to the embodiments of the present invention; the computer program may be stored in a computer readable medium. An example of the computer readable medium includes a semiconductor or solid state storage, a magnetic tape, a removable computer magnetic disk, a random access memory (RAM), a read-only memory (ROM), a hard disk, an optical disk, a magnetic optical disk, or the like.

While the present invention is described with reference to the specific embodiments chosen for purpose of illustration, it should be apparent that the present invention is not limited to these embodiments, but numerous modifications could be made thereto by those skilled in the art without departing from the basic concept and scope of the present invention.

The present application is based on Chinese Priority Patent Application No. 201010122008.7 filed on Mar. 11, 2010, the entire contents of which are hereby incorporated by reference.

What is claimed is:

1. An apparatus for identifying a laser spot and locating coordinates of the laser spot, comprising:
   a foreground calculation unit used to calculate a foreground image in an input image captured by a camera device;
   a threshold value estimation unit used to automatically estimate, at an initialization stage of the apparatus, a first pixel brightness threshold value, a second pixel brightness threshold value, a first pixel degree-of-saturation threshold value, a second pixel degree-of-saturation threshold value, and a pixel color-tone threshold value range based on the foreground image calculated by the foreground calculation unit;
   a laser spot detection unit used to detect, at a processing stage of the apparatus, the laser spot based on the foreground image calculated by the foreground calculation unit as well as the first pixel brightness threshold value, the second pixel brightness threshold value, the first pixel degree-of-saturation threshold value, the second pixel degree-of-saturation threshold value, and the pixel color-tone threshold value range; and
   a coordinate locating unit used to calculate the coordinates of the laser spot in the input image based on the laser spot detected by the laser spot detection unit.

2. The apparatus according to claim 1, wherein:
   the foreground calculation unit first calculates a background image in the input image, and then calculates the foreground image by subtracting the background image from the input image.

3. The apparatus according to claim 1, wherein:
   the threshold value estimation unit analyzes the foreground image, and then estimates the first pixel brightness threshold value, the second pixel brightness threshold value, the first pixel degree-of-saturation threshold value, the second pixel degree-of-saturation threshold value, and the pixel color-tone threshold value range based on brightness values, degree-of-saturation values, and color-tone values of pixels in the foreground image.

4. The apparatus according to claim 1, wherein:
   the laser spot detection unit classifies, based on brightness values, degree-of-saturation values, and color-tone values of pixels in the foreground image, the pixels in the foreground image, and detects, based on the classified results, the laser spot, wherein, the classified results are obtained as follows:
   if a pixel in the foreground image satisfies following relationships $B(p) > T1(b)$ and $S(p)<T1(s)$, then the pixel in the foreground image is classified as belonging to a first category; here p refers to the pixel in the foreground image, B(p) refers to a brightness value of the pixel in the foreground image, T1(b) refers to the first pixel brightness threshold value, S(p) refers to a degree-of-saturation value of the pixel in the foreground image, and T1(s) refers to the first pixel degree-of-saturation threshold value, if a pixel in the foreground image satisfies following relationships $H(p) \in T(h)$, $B(p)>T2(b)$, and $S(p)>T2(s)$, then the pixel in the foreground image is classified as belonging to a second category; here H(p) refers to a color-tone value of the pixel in the foreground image, T(h) refers to the pixel color-tone threshold value range, B(p) refers to a brightness value of the pixel in the foreground image, T2(b) refers to the second pixel brightness threshold value, S(p) refers to a degree-of-saturation value of the pixel in the foreground image, and T2(s) refers to the second pixel degree-of-saturation threshold value, and if a pixel in the foreground image does not belong to the first category and the second category, then the pixel in the foreground image is classified as belonging to a third category.

5. The apparatus according to claim 4, wherein, the laser spot detection unit detects the laser spot by carrying out operations of:

calculating one or more combination areas RA and one or more combination areas RB composed of the pixels belonging to the first category and the second category, respectively, and removing all the pixels belonging to the third category;

removing the combination areas RA in which the numbers of the pixels are greater than a predetermined threshold value;

combining the remaining combination areas RA, in which a distance between any two remaining combination areas RA is less than a predetermined threshold value, so as to generate one or more new combination areas MA;

removing the new combination areas MA which are not adjacent to the combination areas RB;

combining the combination areas RB which are adjacent to the new combination areas MA so as to generate one or more new combination areas MB;

calculating overlapping degrees of the remaining new combination areas MA and the new combination areas MB, and removing the remaining new combination areas MA and the new combination areas MB whose overlapping degrees are less than a predetermined threshold value;

calculating outlines of the remaining new combination areas MA; and letting the new combination area MA whose outline is an approximate circle be the laser spot.

6. The apparatus according to claim 1, wherein:

the coordinate locating unit calculates coordinates of the center of the laser spot to serve as the coordinates of the laser spot.

7. A method of identifying a laser spot and locating coordinates of the laser spot, comprising:

a foreground calculation step of calculating a foreground image in an input image captured by a camera device;

a threshold value estimation step of automatically estimating, at an initialization stage, a first pixel brightness threshold value, a second pixel brightness threshold value, a first pixel degree-of-saturation threshold value, a second pixel degree-of-saturation threshold value, and a pixel color-tone threshold value range based on the foreground image calculated by the foreground calculation step;

a laser spot detection step of detecting, at a processing stage, the laser spot based on the foreground image calculated by the foreground calculation step as well as the first pixel brightness threshold value, the second pixel brightness threshold value, the first pixel degree-of-saturation threshold value, the second pixel degree-of-saturation threshold value, and the pixel color-tone threshold value range; and a coordinate locating step of calculating the coordinates of the laser spot in the input image based on the laser spot detected by the laser spot detection step.

8. The method according to claim 7, wherein, the laser spot detection step comprises:

a pixel classification step of classifying, based on brightness values, degree-of-saturation values, and color-tone values of pixels in the foreground image, the pixels in the foreground image, and detects, based on the classified results, the laser spot, wherein, the classified results are obtained as follows:

if a pixel in the foreground image satisfies following relationships $B(p)>T1(b)$ and $S(p)<T1(s)$, then the pixel in the foreground image is classified as belonging to a first category; here p refers to the pixel in the foreground image, B(p) refers to a brightness value of the pixel in the foreground image, T1(b) refers to the first pixel brightness threshold value, S(p) refers to a degree-of-saturation value of the pixel in the foreground image, and T1(s) refers to the first pixel degree-of-saturation threshold value, if a pixel in the foreground image satisfies following relationships $H(p) \in T(h)$, $B(p)>T2(b)$, and $S(p)>T2(s)$, then the pixel in the foreground image is classified as belonging to a second category; here H(p) refers to a color-tone value of the pixel in the foreground image, T(h) refers to the pixel color-tone threshold value range, B(p) refers to a brightness value of the pixel in the foreground image, T2(b) refers to the second pixel brightness threshold value, S(p) refers to a degree-of-saturation value of the pixel in the foreground image, and T2(s) refers to the second pixel degree-of-saturation threshold value, and if a pixel in the foreground image does not belong to the first category and the second category, then the pixel in the foreground image is classified as belonging to a third category.

9. The method according to claim 8, wherein, the laser spot detection step further comprises steps of:
    calculating one or more combination areas RA and one or more combination areas RB composed of the pixels belonging to the first category and the second category, respectively, and removing all the pixels belonging to the third category;
    removing the combination areas RA in which the numbers of the pixels are greater than a predetermined threshold value;
    combining the remaining combination areas RA, in which a distance between any two remaining combination areas RA is less than a predetermined threshold value, so as to generate one or more new combination areas MA;
    removing the new combination areas MA which are not adjacent to the combination areas RB;
    combining the combination areas RB which are adjacent to the new combination areas MA so as to generate one or more new combination areas MB;
    calculating overlapping degrees of the remaining new combination areas MA and the new combination areas MB, and removing the remaining new combination areas MA and the new combination areas MB whose overlapping degrees are less than a predetermined threshold value;
    calculating outlines of the remaining new combination areas MA; and
    letting the new combination area MA whose outline is an approximate circle be the laser spot.

10. A virtual whiteboard system comprising:
    a projection device used to project a visible image onto a screen;
    a laser pointer used to project a laser spot onto the screen;
    a camera device used to capture the image projected onto the screen; and
    an apparatus for identifying the laser spot and locating coordinates of the laser spot, including:
        a foreground calculation unit used to calculate a foreground image in the image captured by the camera device;
        a threshold value estimation unit used to automatically estimate, at an initialization stage of the apparatus, a first pixel brightness threshold value, a second pixel brightness threshold value, a first pixel degree-of-saturation threshold value, a second pixel degree-of-saturation threshold value, and a pixel color-tone threshold value range based on the foreground image calculated by the foreground calculation unit;
        a laser spot detection unit used to detect, at a processing stage of the apparatus, the laser spot based on the foreground image calculated by the foreground calculation unit as well as the first pixel brightness threshold value, the second pixel brightness threshold value, the first pixel degree-of-saturation threshold value, the second pixel degree-of-saturation threshold value, and the pixel color-tone threshold value range; and
        a coordinate locating unit used to calculate the coordinates of the laser spot in the image based on the laser spot detected by the laser spot detection unit.

* * * * *